US00RE43121E

(19) United States
(12) Reissued Patent
Peterson

(10) Patent Number: US RE43,121 E
(45) Date of Reissued Patent: Jan. 24, 2012

(54) CASCADE REFRIGERATION SYSTEM

(75) Inventor: Clinton A. Peterson, Holland, MI (US)

(73) Assignee: Venturedyne Limited, Milwaukee, WI (US)

(21) Appl. No.: 11/986,008

(22) Filed: Nov. 20, 2007

Related U.S. Patent Documents

Reissue of:
(64) Patent No.: 6,189,329
Issued: Feb. 20, 2001
Appl. No.: 09/543,083
Filed: Apr. 4, 2000

(51) Int. Cl.
*F25B 41/00* (2006.01)

(52) U.S. Cl. ..... 62/196.1; 62/335

(58) Field of Classification Search ..... 62/335, 62/196.4, 197, 333, 434, 196.1
See application file for complete search history.

(56) References Cited

U.S. PATENT DOCUMENTS

| | | | | |
|---|---|---|---|---|
| 2,332,711 A | | 10/1943 | Gould et al. | |
| 2,940,269 A | * | 6/1960 | Frainier | 62/644 |
| 3,590,595 A | | 7/1971 | Briggs | |
| 3,735,599 A | * | 5/1973 | Izumichi et al. | 62/651 |
| 4,041,724 A | | 8/1977 | Gustafsson et al. | |
| 4,526,595 A | * | 7/1985 | McNeil | 62/651 |
| 4,550,574 A | * | 11/1985 | Hohman | 62/197 |
| 4,731,102 A | * | 3/1988 | Yoshino | 62/654 |
| 4,732,008 A | | 3/1988 | DeVault | |
| 4,784,213 A | | 11/1988 | Egger et al. | |
| 4,869,069 A | | 9/1989 | Scherer | |
| 5,462,110 A | * | 10/1995 | Sarver | 165/48.1 |
| 5,729,993 A | | 3/1998 | Boiarski et al. | |

FOREIGN PATENT DOCUMENTS

| | | |
|---|---|---|
| EP | 0747643 | 12/1996 |
| JP | 04244559 | 1/1993 |
| JP | 07127935 | 9/1995 |

* cited by examiner

*Primary Examiner* — Mohammad Ali
(74) *Attorney, Agent, or Firm* — Michael Best & Friedrich LLP

(57) ABSTRACT

A cascade refrigeration system is provided. The cascade refrigeration system includes a low stage having a first refrigerant flowing therethrough and a high stage having a second refrigerant flowing therethrough. The low stage includes a compressor and evaporator coils. The input of the evaporator coils is operatively connected to the output of the compressor by an input conduit and the output of the operator unit is operatively connected to the input of the compressor by an output conduit. A bypass line has an input in communication with the input conduit and an output in combination with the output conduit. A bypass heat exchanger effectuates the heat exchange relationship between the first refrigerant flowing through the bypass line and the first refrigerant flowing through the input conduit.

21 Claims, 1 Drawing Sheet

CASCADE REFRIGERATION SYSTEM

Matter enclosed in heavy brackets [ ] appears in the original patent but forms no part of this reissue specification; matter printed in italics indicates the additions made by reissue.

FIELD OF THE INVENTION

This invention relates generally to refrigeration systems, and in particular, to a two stage, cascade refrigeration system for controlling temperatures with a chamber.

BACKGROUND AND SUMMARY OF THE PRESENT INVENTION

A cascade refrigeration system is typically used when relatively low temperatures are desired in a controlled environment. The cascade refrigeration system includes evaporator coils positioned within a chamber in which the environment is to be controlled. Refrigerant is supplied to the evaporator coils by a conventional compressor/condenser system. The compressor receives the refrigerant in gaseous form from the evaporator coils and compresses the refrigerant. The heat of compression is removed by the condenser and the refrigerant is provided in liquid form to an expansion valve upstream of the evaporator coils. The refrigerant returns to a gaseous state as it passes through the evaporator coils, thereby cooling the chamber in which the evaporator coils are located. In a cascade refrigeration system, a high stage is used to cool the refrigerant passing through the condenser. Refrigerant is outputted from the compressor/condenser of the high stage and passed through an expansion valve. The expanded refrigerant is delivered to the condenser in a heat exchanging relationship with the refrigerant outputted from the low stage compressor so as to cool the refrigerant outputted from the low stage compressor. Additional stages may be provided in a cascading relationship, if necessary.

By way of example, a prior art cascade refrigeration system is shown in Briggs, U.S. Pat. No. 3,590,595. The Briggs '595 patent discloses a two stage cascade refrigeration system which incorporates two heat exchangers. The heat exchangers effectuate a heat exchanging relationship between the refrigerant flowing through the low stage and the refrigerant flowing through the high stage. It is noted, however, that if one of the heat exchangers develops an internal leak, the refrigerant in the low stage and the refrigerant in the high stage will be allowed to mix. Disposal of mixed refrigerants is both difficult and expensive.

Therefore, it is a primary object and feature of the present invention to provide a cascade refrigeration system which reduces the possibility of mixing refrigerants flowing through the low and high stages of the system.

It is a further object and feature of the present invention to provide a cascade refrigeration system which is simple and inexpensive to manufacture.

It is still a further object and feature of the present invention to provide a cascade refrigeration system which accurately controls the environment within a desired chamber.

In accordance with the present invention, a cascade refrigeration system is provided. The cascade refrigeration system has a low stage having a first refrigerant flowing therethrough. The low stage includes a compressor having an input and an output, and an evaporator unit having an input operatively connected to the output of the compressor by an input conduit and an output operatively connected to the input of compressor by an output conduit. A bypass line is also provided. The bypass line has an input in communication with the input conduit of the low stage and an output in communication with the output conduit of the low stage. A bypass heat exchanger effectuates the heat exchanger relationship between the first refrigerant in the bypass line and the first refrigerant in the input conduit of the low stage.

A high stage may also be provided which has a second refrigerant flowing therethrough. The high stage includes a compressor having an input and an output, and a condenser unit having an input operatively connected to the output of the high stage of the compressor and an output operatively connected to the input of the high stage compressor by the output conduit. The second heat exchanger effectuates the heat exchanger relationship between the first refrigerant flowing through the input conduit of the low stage and the second refrigerant flowing through the output conduit of the high stage.

It is contemplated that the condensor unit of the high stage effectuate a heat exchange between the second refrigerant flowing therethrough and a fluid from a fluid source. The high stage further includes a first bypass line having an input in communication with the input conduit of the high stage and an output in communication with the output conduit of the high stage downstream of the second heat exchanger. A bypass solenoid is provided in the first bypass line of the high stage for controlling the flow of the second refrigerant therethrough.

It is contemplated that the output of the bypass line communicate with the input conduit of the low stage downstream of the second heat exchanger. The input conduit of the low stage may include a condenser unit upstream of the bypass heat exchanger for effectuating a heat exchange between the first refrigerant fluid flowing therethrough and a fluid from a fluid source.

In accordance with a still further aspect of the present invention, a cascade refrigeration system is provided. The cascade refrigeration system includes a low stage compressor having an input and an output and a low stage evaporator unit having an input and an output. A low stage input conduit operatively connects the output of the low stage compressor to the input of the low stage evaporator unit. A low stage output conduit operatively connects the output of the low stage evaporator unit to the input of the low stage compressor. A low stage refrigerant flows between the low stage compressor and the low stage evaporator unit through the low stage input and output conduits. A first bypass line has an input in communication with the low stage input conduit and an output in communication with the low stage output conduit. A bypass heat exchanger effectuates the heat exchange relationship between the low stage refrigerant flowing through the first bypass line and the low stage refrigerant flowing through the low stage input conduit.

It is contemplated that the cascade refrigeration system further include a high stage compressor having an input and an output, and a high stage condenser unit having an input and an output. A high stage input conduit operatively connects the output of the high stage compressor to the input of the high stage condenser unit. A high stage output conduit operatively connects the output of the high stage condenser unit to the input of the high stage of the compressor. A high stage refrigerant flows between the high stage compressor and the high stage condenser unit through the high stage input and output conduits. The high stage condenser unit effectuates a heat exchange between the high stage refrigerant flowing therethrough and a fluid from a fluid source. A second heat exchanger effectuates the heat exchange between the low stage refrigerant within the low stage input conduit and the high stage refrigerant within the high stage output conduit.

A second bypass line has an input in communication with the high stage input conduit and an output in communication with the high stage output conduit downstream of the second heat exchanger. A second bypass solenoid in the second bypass line controls the flow of the high stage refrigerant therethrough.

A low stage bypass valve interconnects the first bypass line to the low stage input conduit. The low stage bypass valve controls the flow of the low stage refrigerant therebetween. The low stage input conduit includes a condenser unit upstream of the bypass heat exchanger in order to effectuate a heat exchange between the low stage refrigerant flowing therethrough and a fluid from a fluid source.

In accordance with still further aspect of the present invention, a cascade refrigeration system is provided. The cascade refrigeration system includes a low stage having a first refrigerant flowing therethrough. The low stage includes a compressor having an input and an output and an evaporator unit having an input operatively connected to the output of the compressor by an input conduit and an output operatively connected to the input of the compressor by an output conduit. The cascade refrigeration system also includes a high stage having a second refrigerant flowing therethrough. The high stage includes a compressor having an input and an output and a heat exchanger having an input operatively connected to the output of the high stage compressor by an input conduit and an output conduit connected to the input of the high stage compressor by an output conduit. The heat exchanger effectuates the heat exchange between the first refrigerant within the input conduit of the low stage and the second refrigerant within the output conduit of the high stage. A bypass line has an input in communication with the input conduit of the low stage and an output in communication with the output conduit of the high stage. A bypass heat exchanger effectuates the heat exchanger relationship between the first refrigerant in the bypass line and the first refrigerant in the input conduit of the low stage.

The high stage further includes a condenser unit for effectuating an heat exchange between the second refrigerant flowing through the input conduit and a fluid from a fluid source. The high stage may also include a first bypass line having an input in communication with the input conduit of the high stage and an output in communication with the output conduit of the high stage downstream of the heat exchanger. A bypass solenoid is provided in the first bypass line in the high stage for controlling the flow of the second refrigerant therethrough.

The input of the bypass line communicates with the input conduit of the low stage downstream of the heat exchanger. A bypass valve inter connects the bypass line to the input conduit of the low stage. The bypass valve controls the flow of the first refrigerant therebetween. The input conduit of the low stage may also include a condenser unit upstream of the bypass heat exchanger for effectuating a heat exchanger between the first refrigerant flowing therethrough and a fluid from a fluid source.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWING

Figure 1:
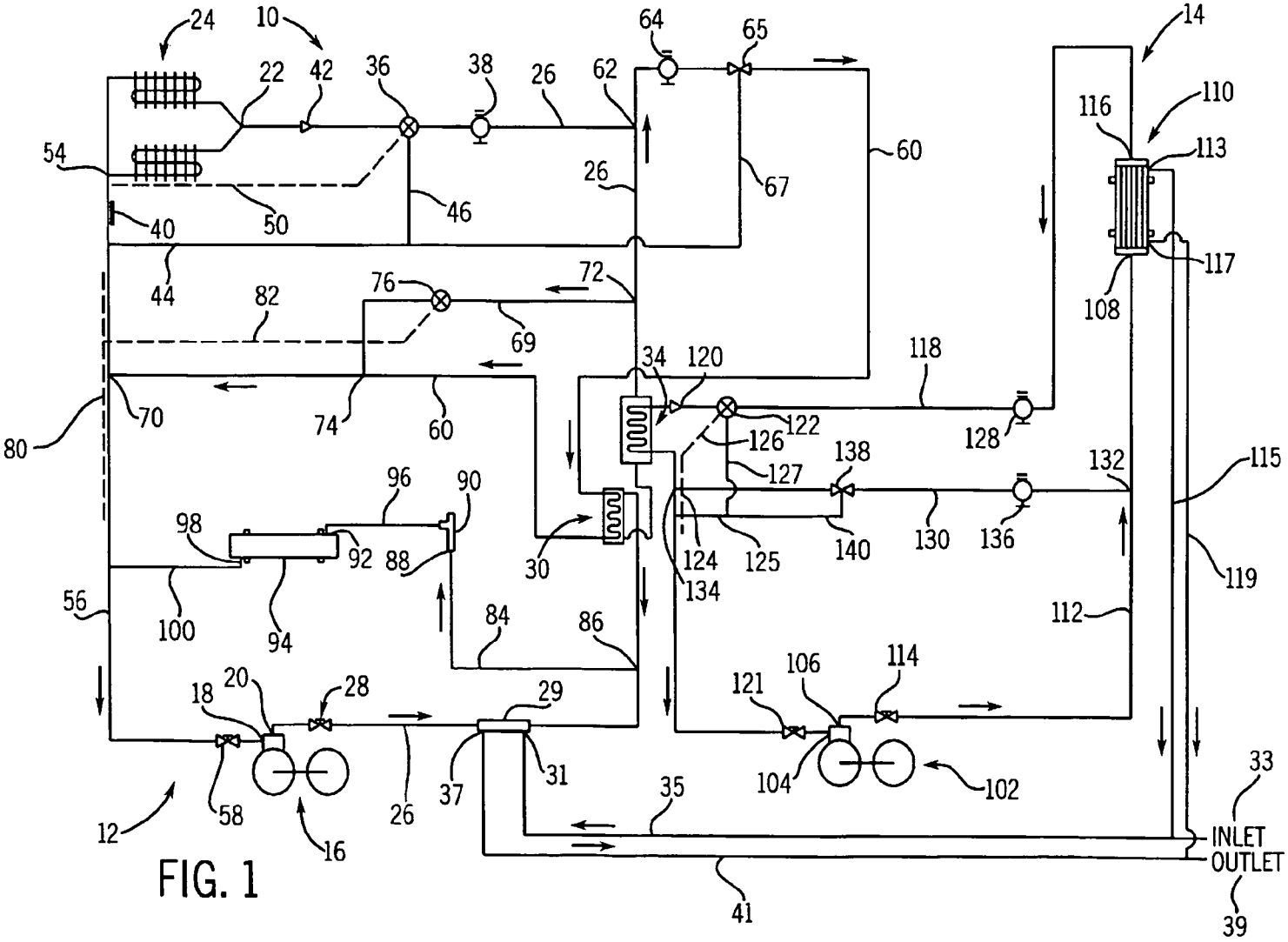
FIG. 1 is a schematic view of a cascade refrigeration system in accordance with the present invention.

Referring to FIG. 1, a cascade refrigeration system in accordance with the present invention is generally designated by the reference numeral 10. Cascade refrigeration system 10 includes a low stage generally designated by the reference numeral 12 and a high stage generally designated by the reference numeral 14. As is conventional, each stage 12 and 14 has corresponding refrigerant flowing therethrough in a manner hereinafter described. In addition, while the cascade refrigeration system of FIG. 1 discloses only first and low stages, it can be appreciated that a number of additional stages may be provided in a cascading relationship without deviating from the scope of the present invention.

Low stage 12 of cascade refrigeration system 10 includes a compressor 16 having an input 18 and an output 20. Output 20 of compressor 16 is connected to input 22 of evaporator coils 24 by line 26. A shut-off valve 28 is provided in line 26 to control the flow of refrigerant from compressor 16 to evaporator coils 24. As is conventional, shut-off valve 28 is movable between a first open position allowing the flow of refrigerant therethrough and a second closed position preventing the flow of refrigerant therethrough.

A desuperheater 29 is positioned about line 26 downstream of shut-off valve 28 in order to remove heat from the refrigerant exiting compressor 16. Desuperheater 29 has an input 31 connected to a fluid source inlet 33 by line 35 and an output 37 connected to an outlet 39 by line 41. As is conventional, fluid flows from the fluid source 33; through desuperheater 29; and out of outlet 39. It is contemplated to utilize water as the fluid flowing through desuperheater 29 to remove heat from the refrigerant exiting compressor 16, but other types of fluids, including air, may be used without deviating from the scope of the present invention.

Line 26 also passes through bypass heat exchanger 30 and through second heat exchanger 34 for reasons hereinafter described. An expansion valve 36 and a liquid solenoid 38 are also provided in line 26. Refrigerant flowing to expansion valve 36 through line 26 is controlled by a liquid solenoid 38. As is conventional, the opening and closing of liquid solenoid 38 is controlled by a control program.

A sensing bulb 40 is operatively connected to expansion valve 36 by line 50 downstream of evaporator coils 24 in order to monitor the temperature of the refrigerant exiting evaporator coils 24. Similarly, a pressure sensor (not shown) is operatively connected to expansion valve 36 by lines 44 and 46 downstream of evaporator coils 24 in order to monitor the pressure of the refrigerant exiting evaporator coils 24 in line 56. As is conventional, expansion valve 36 modulates in response to the temperature and the pressure of refrigerant exiting evaporator coils 24. Refrigerant which passes through expansion valve 36 flows through distributor 42 into evaporator coils 24.

Output 54 of evaporator coils 24 is interconnected to the input 18 of compressor 16 by line 56. A shut-off valve 58 is provided in line 56 for controlling the flow of refrigerant into compressor 16. As is conventional, shut-off valve 58 is movable between a first open position allowing flow of refrigerant therethrough and a second closed position preventing the flow of refrigerant therethrough.

Low stage 12 of cascade refrigeration system 10 further includes a bypass line 60 having an input 62 in communication with line 24 downstream of heat exchanger 34. A liquid solenoid 64 in bypass line 60 controls the flow of refrigerant therethrough. As is conventional, the opening and closing of liquid solenoid 64 is controlled by a control program. Pressure valve 65 incorporates a pressure sensor (not shown) which is connected by lines 67 and 44 to line 56 in order to monitor the pressure of the refrigerant exiting evaporator coils 24 in line 56. Pressure valve 65 opens in response to the pressure of refrigerant exiting evaporator coils 24 being less than a user selected pressure, e.g. 10 psi, thereby allowing the flow of refrigerant therethrough. Bypass line 60 extends through bypass heat exchanger 30 and terminates at an output 70 which communicates with line 56 upstream of shut-off valve 58.

Low stage 12 of cascade refrigeration system 10 also includes a second bypass line 69 having an input 72 in communication with line 26 downstream of heat exchanger 34 and an output 74 communicating with bypass line 60 downstream of bypass heat exchanger 30. Expansion valve 76 controls the flow of refrigerant through second bypass line 69. Sensing bulb 80 is operatively connected to expansion valve 76 by line 82 and is positioned adjacent line 56 downstream of evaporator coils 24 to monitor the temperature of the refrigerant exiting evaporator coils 24. As sensing bulb 80 senses an increase in temperature in line 56, expansion valve 76 opens so as to allow more refrigerant to pass therethrough. Conversely, as the temperature sensed by sensing bulb 80 decreases, expansion valve 76 closes so as to restrict the flow of refrigerant therethough.

Low stage 12 of cascade refrigeration system 10 further includes a third bypass line 84 having an input 86 in communication with line 26 upstream of bypass heat exchanger 30. Output 88 of third bypass line 84 feeds a dump pressure regulating valve 90 which is interconnected to the input 92 of a vapor tank 94 by line 96. Output 98 of vapor tank 94 is interconnected to line 56 downstream of evaporator coil 24 by line 100.

High stage 14 of cascade refrigeration system 10 includes a compressor 102 having input 104 and an output 106. Output 106 of compressor 102 is connected to a first input 108 of a condenser unit 110 by line 112. A shut-off valve 114 is provided in line 112 to control the flow of refrigerant from compressor 102. As is conventional, shut-off valve 114 is movable between a first open position allowing the flow of refrigerant therethrough and a second closed position preventing a flow of refrigerant therethrough.

Condenser unit 110 is positioned about line 112 downstream of shut-off valve 114 in order to remove heat from the refrigerant exiting compressor 102. Condenser unit 110 has a second input 113 connected to fluid source inlet 33 by line 115 and a second output 117 connected to an outlet 39 by line 119. As is conventional, fluid flows from the fluid source 33; through condenser unit 110; and out of outlet 39. As heretofore described, it is contemplated to utilize water as the fluid flowing through condenser unit 110 to remove heat from the refrigerant exiting compressor 102, but other types of fluids, including air, may be used without deviating from the scope of the present invention.

Output 116 of condenser unit 110 is interconnected to the input 104 of compressor 102 by line 118. A shut-off valve 121 is provided in line 118 for controlling the flow of refrigerant into compressor 102. As is conventional, shut-off valve 121 is movable between a first open position allowing flow of refrigerant therethrough and a second closed position preventing the flow of refrigerant therethrough.

Line 118 passes through second heat exchanger 34, upstream of shut-offvalve 121, so as to effectuate a heat exchange between the refrigerant flowing through line 118 and the refrigerant flowing through line 26. Line 118 further includes a distributor 120, an expansion valve 122, and a liquid solenoid 128. Liquid solenoid 128 controls the flow of refrigerant to expansion valve 122. As is conventional, the opening and closing of liquid solenoid 128 is controlled by a control program.

Sensing bulb 124 is operatively connected to expansion valve 122 by line 126 and is positioned adjacent line 118 downstream of heat exchanger 34 in order to monitor the temperature of the refrigerant exiting heat exchanger 34. Similarly, a pressure sensor (not shown) is incorporated into expansion valve 122 and connected to line 118 downstream of heat exchanger 34 by lines 125 and 127 in order to monitor the pressure of the refrigerant exiting heat exchanger 34 in line 118. As is conventional, expansion valve 122 modulates in response to the temperature and the pressure of refrigerant exiting heat exchanger 34. Refrigerant which passes through expansion valve 122 flows through distributor 120 into heat exchanger 34.

High stage 14 of cascade refrigeration unit 10 further includes a bypass line 130 having an input 132 in communication with line 112 upstream of condenser unit 110 and an output 134 downstream of second heat exchanger 34. Liquid solenoid 136 in bypass line 130 controls the flow of refrigerant therethrough. As is conventional, the opening and closing of liquid solenoid 136 is controlled by a control program. Pressure valve 138 incorporates a pressure sensor (not shown) connected to line 118 by lines 140 and 125 in order to monitor the pressure of the refrigerant exiting heat exchanger 34 in line 118. Pressure valve 138 opens in response to the pressure of refrigerant exiting heat exchanger 34 being less than a user selected pressure, e.g. 10 psi, thereby allowing the flow of refrigerant therethrough.

Referring to the high stage 14 of cascade refrigeration system 10, in operation, shut-off valves 114 and 121 are opened and compressor 102 compresses the refrigerant therein such that high pressure, high temperature refrigerant exits compressor 102 in line 112. The high pressure, high temperature refrigerant passes through condenser unit 110 wherein a heat exchange is effectuated between the high pressure, high temperature refrigerant exiting compressor 102 and the fluid flowing through condenser unit 110 so as to remove heat from the refrigerant and to change the refrigerant to a liquid state. The cooled, high pressure refrigerant passes through heat exchanger 34, for reasons hereinafter described, under control of liquid solenoid 128 and returns to compressor 102. Expansion valve 122 modulates in response to the temperature and the pressure of refrigerant exiting heat exchanger 34 in order to adjust temperature and pressure of the refrigerant passing through heat exchanger 34. Bypass line 130 insures adequate pressure of the refrigerant flowing through line 118 downstream of heat exchanger 34.

Referring to low stage 12 of cascade refrigeration system 10, shut-off valves 58 and 28 are opened and compressor 16 compresses the refrigerant therein such that high pressure, high temperature refrigerant exits compressor 16 into line 26. The high pressure, high temperature refrigerant in line 26 passes through desuperheater 29 wherein a heat exchange is effectuated between the high pressure, high temperature refrigerant exiting compressor 16 and the fluid flowing through desuperheater 29 so as to remove heat from the high pressure, high temperature refrigerant. If, after passing through desuperheater 29, the refrigerant in line 26 exceeds a predetermined maximum pressure, dump pressure regulating valve 90 opens so as to relieve the pressure in line 26 thereby allowing the high pressure refrigerant, in gaseous form, to enter vapor tank 94. The refrigerant in vapor tank 94 is slowly released into to line 56 and returned to compressor 16.

Alternatively, the cooled, high pressure refrigerant in line 26 passes through bypass heat exchanger 30 and through heat exchanger 34. Within heat exchanger 34, a heat exchange is effectuated between the refrigerant flowing through the low stage 12 of cascade refrigeration system 10 and the refrigerant flowing through the high stage 14 of cascade refrigeration system 10 so as to further cool the refrigerant passing therethrough to a point of condensation.

In addition, a portion of the cooled, high pressure refrigerant flowing through the low stage 12 of cascade refrigeration system 10 and exiting heat exchanger 34 enters bypass line 60 under the control of liquid solenoid 64. A pressure drop occurs across pressure valve 65 so that the cooled, low pressure refrigerant in bypass line 60 flows through bypass heat exchanger 30 to effectuate a heat exchange between the refrigerant in line 26 which exits compressor 16 and the cooled, low pressure refrigerant in bypass line 60 thereby removing additional heat from the refrigerant in line 26 prior to entering heat exchanger 34. Thereafter, the cooled, low pressure refrigerant in bypass line 60 flows into line 56 and returns to compressor 16.

A further portion of the cooled, high pressure refrigerant flowing in line 26 flows towards expansion valve 36 under the control of liquid solenoid 38. Expansion valve 36 modulates in response to the temperature and the pressure of refrigerant exiting evaporator coils 24 in order to adjust the temperature and pressure of the refrigerant passing through evaporator coils, and hence, the temperature of the chamber (not shown) in which evaporator coils 24 are located. As is known, the cooled, high pressure refrigerant expands in evaporator coils 24 and returns to a gaseous state.

If the temperature of the refrigerant in line 56 exceeds a predetermined temperature, the refrigerant may damage compressor 16 upon return thereto. As such, the temperature of the refrigerant in line 56 is monitored by sensing bulb 80 such that if the temperature of the refrigerant in line 56 exceeds a threshold, expansion valve 76 opens so as to divert a portion of the cooled, high pressure refrigerant in line 26 downstream of heat exchanger 34 into bypass line 60 downstream of bypass heat exchanger 30 through second bypass line 69. Thereafter, the cooled, low pressure refrigerant flows through output 70 of bypass line 60 and into line 56.

As described, the cascade refrigeration system 10 incorporates a bypass heat exchanger 30 having the same, low stage refrigerant on both sides thereof. Consequently, a leak within bypass heat exchanger 30 will not result in the mixing of the refrigerant flowing through the low stage 12 of cascade refrigeration system 10 and the refrigerant flowing through the high stage of cascade refrigeration system 10. As a result, cascade refrigeration system 10 may continue to operate even if such a leak occurs. Further, if a leak occurs in bypass heat exchanger 30, the mixing of the refrigerant flowing on both sides thereof will not result in any future disposal problems, as heretofore described.

Various modes of carrying out the invention are contemplated as being within the scope of the following claims particularly pointing out and distinctly claiming the subject matter which is regarded as the invention.

What is claimed is:

1. A two-stage cascade refrigeration system, comprising:

a low stage having a first refrigerant flowing therethrough, the low stage including a compressor having an input and an output, and an evaporator unit having an input operatively connected to the output of the compressor *through a stage heat exchanger* by an input conduit and an output operatively connected to the input of the compressor by an output conduit*, the stage heat exchanger having an upstream side and a downstream side*;

a bypass line having an input [in communication with the input conduit of the low stage and] *connected to the low stage input conduit downstream of the stage heat exchanger,* an output [in communication with the] *connected to the low stage* output conduit [of the low stage; and a bypass heat exchanger for effectuating a heat exchange relationship between the first refrigerant in the bypass line and the first refrigerant in the input conduit of the low stage]*, the bypass line passing through a bypass heat exchanger in heat exchange relationship with the first refrigerant in the low stage input conduit upstream of the stage heat exchanger*.

2. The system of claim 1 further comprising:

a high stage having a second refrigerant flowing therethrough, the high stage including *a high stage input conduit and a high stage output conduit,* a compressor having an input and an output, and a condenser unit having an input operatively connected to the output of the high stage compressor and an output operatively connected to the input of the high stage compressor by output conduit[; and a second heat exchanger for effectuating a heat exchange relationship between the first refrigerant within the input conduit of the low stage and the second refrigerant within the output conduit of the high stage]*, the second refrigerant flowing between the high stage compressor and the high stage condenser unit through the high stage input and output conduits, the high stage refrigerant in each exchange relationship with the low stage refrigerant in the stage heat exchanger*.

[3. The system of claim 2 wherein the input of the bypass line communicates with the input conduit of the low stage downstream of the second heat exchanger.]

4. The system of claim 2 wherein the condenser unit of the high stage effectuates a heat exchange between the second refrigerant therein and a fluid from a fluid source.

5. The system of claim 2 wherein the high stage further includes a first bypass line having an input in communication with the input conduit of the high stage and output in communication with the output conduit of the high stage downstream of the heat exchanger.

6. The system of claim 5 further comprising a bypass solenoid in the first bypass line of the high stage for controlling the flow of the second refrigerant therethrough.

7. The system of claim 1 further comprising a bypass valve [interconnecting the bypass line to the input conduit of the low stage, the bypass valve controlling the flow of the first refrigerant therebetween] *in the first bypass line upstream of the stage heat exchanger, the low stage bypass valve controlling the flow of low stage refrigerant based on an amount of pressure in the low stage output conduit*.

8. The system of claim 1 wherein the input conduit of the low stage includes a condenser unit upstream of the bypass heat exchanger for effectuating a heat exchange between the first refrigerant therein and a fluid from a fluid source.

9. A two-stage cascade refrigeration system, comprising:

a low stage compressor having an input and an output;

a low stage evaporator unit having an input and an output*;* a low stage input conduit for operatively connecting the output of the low stage compressor to the input of the low stage evaporator unit *through a stage heat exchanger, the stage heat exchanger having an upstream side and a downstream side*;

a low stage output conduit for operatively connecting the output of the low stage evaporator unit to the input of the low stage compressor;

a low stage refrigerant flowing between the low stage compressor and the low stage evaporator unit through the low stage input and output conduits;

a first bypass line having an input [in communication with] *connected to* the low stage input conduit [and] *downstream of the stage heat exchanger,* an output [in communication with the] *connected to the* low stage output conduit, *the first bypass line passing through a bypass heat exchanger in heat exchange relationship with the low stage refrigerant in the low stage input conduit upstream of the stage heat exchanger*; and

[a bypass heat exchanger for effectuating a heat exchange relationship between the first refrigerant in the first bypass line and the low stage refrigerant in the low stage input conduit]

*wherein the low stage input conduit further includes a condenser unit upstream of the bypass heat exchanger for effectuating heat exchange between the low stage refrigerant therein and a fluid from a fluid source.*

10. The system of claim 9 further comprising:

a high stage compressor having an input and an output;

a high stage condenser unit having an input and an output*;* a high stage input conduit for operatively connecting the output of the high stage compressor to the input of the high stage condenser unit;

a high stage output conduit for operatively connecting the output of the high stage condenser unit to the input of the high stage compressor *through the stage heat exchanger*; and a high stage refrigerant flowing between the high stage compressor and the second stage condenser unit through the high stage input and output conduits, *the high stage refrigerant in heat exchange relationship with the low stage refrigerant in the stage heat exchanger.*

11. The system of claim 10 wherein the high stage condenser unit effectuates a heat exchange between the high stage refrigerant therein and a fluid from a fluid source.

[12. The system of claim 10 further comprising a second heat exchanger for effectuating a heat exchange between the low stage refrigerant within the low stage input conduit and the high stage refrigerant within the high stage output conduit.]

[13. The system of claim 12 wherein the input of the first bypass line communicates with the low stage input conduit downstream of the second heat exchanger.]

14. The system of claim [12] *9* further comprising a second bypass line having an input [in communication with the high stage input conduit and output in communication with the high stage output conduit downstream of the second heat exchanger] *connected to the downstream side of the stage heat exchanger and an output connected to the low stage output conduit.*

15. The system of claim 14 further [comprising a second bypass solenoid in the second bypass line for controlling the flow of the high stage refrigerant therethrough] *wherein the second bypass line includes an expansion valve.*

16. The system of claim 9 further comprising a low stage bypass valve [interconnecting the first bypass line to the low stage input conduit] *in the first bypass line upstream the stage heat exchanger*, the low stage bypass valve controlling the flow of the low stage refrigerant therebetween *therethrough based on an amount of pressure in the low stage output conduit.*

17. The system of claim 9 wherein the low stage input conduit includes a condenser unit upstream of the bypass heat exchanger for effectuating a heat exchanger between the low stage refrigerant therein and a fluid from a fluid source.

18. A two-stage cascade refrigeration system, comprising:

low stage having a first refrigerant flowing therethrough, the low stage including a compressor having an input and an output, and an evaporator unit having an input operatively connected to the output of the compressor *through a stage heat exchanger* by an input conduit and an output operatively connected to the input of the compressor by an output conduit;

a high stage having a second refrigerant flowing therethrough, the high stage including a compressor having an input and an output, and a heat exchanger having an input operatively connected to the output of the high stage compressor by an input conduit and an output operatively connected to the input of the high stage compressor by output conduit, the heat exchanger effectuating a heat exchange between the first refrigerant within the input conduit of the low stage and the second refrigerant within the output conduit of the high stage;

a bypass line having an input in communication with the input conduit of the low stage *downstream of the stage heat exchanger* and an output in communication with the output conduit of the low stage; and a bypass heat exchanger for effectuating a heat exchange relationship [between the first refrigerant in the bypass line and the first refrigerant in the input conduit of the low stage] *with first refrigerant in the low stage input conduit upstream of the stage heat exchanger.*

19. The system of claim 18 wherein the high stage includes a condenser unit for effectuating a heat exchange between the second refrigerant flowing through the input conduit and a fluid from a fluid source.

[20. The system of claim 18 wherein the input of the bypass line communicates with the input conduit of the low stage downstream of the heat exchanger.]

21. The system of claim 19 wherein the high stage further includes a first bypass line having an input in communication with the input conduit of the high stage and output in communication with the output conduit of the high stage downstream of the heat exchanger.

22. The system of claim 21 further [comprising a bypass solenoid in the first bypass line of the high stage for controlling the flow of the second refrigerant therethrough] *wherein the second bypass line includes an expansion valve.*

23. The system of claim 19 further comprising a bypass valve for interconnecting the bypass line to the input conduit of the low stage, the bypass valve controlling the flow of the first refrigerant therebetween.

24. The system of claim 19 wherein the input conduit of the low stage includes a condenser unit upstream of the bypass heat exchanger for effectuating a heat exchange between the first refrigerant therein and a fluid from a fluid source.

*25. The system of claim 15 wherein the bypass heat exchanger has an upstream input conduit side and a downstream input conduit side, the system further including a third bypass line having an input connected to the upstream input conduit side of the bypass heat exchanger and an output connected to the low stage output conduit.*

* * * * *